United States Patent Office 2,904,550
Patented Sept. 15, 1959

2,904,550

4-PHENYLPIPERIDINES AND THEIR PREPARATION

Albert Pohland, Indianapolis, Ind., assignor to Eli Lilly and Company, Indianapolis, Ind., a corporation of Indiana No Drawing. Application January 17, 1958
Serial No. 709,448

5 Claims. (Cl. 260—294.3)

This invention relates to novel oxygenated 4-phenyl-piperidines. More particularly, it relates to di-esters of di-hydroxy-N-aralkyl-4-phenylpiperidines, and to their acid addition salts.

The novel oxygenated 4-phenylpiperidine bases provided by this invention can be represented by the following formula:

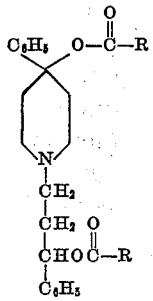

wherein R is a lower alkyl group having from 1 to 3 carbon atoms.

Also included within the scope of this invention are the pharmaceutically acceptable non-toxic acid addition salts of the bases represented by the above formula, illustrative examples being the hydrochloride, sulfate, phosphate, maleate, citrate, and like salts.

Piperidine bases within the scope of the above formula which illustrate this invention include 1-(3-phenyl-3-acetoxypropyl - 1) - 4 - phenyl - 4 - acetoxypiperidine, 1-(3-phenyl - 3 - propionoxypropyl - 1) - 4 - phenyl - 4 - propionoxypiperidine, 1 - (3 - phenyl - 3 - butyroxypropyl-1) - 4 - phenyl - 4 - butyroxypiperidine, and 1 - (3 - phenyl-3 - acetoxypropyl - 1) - 4 - phenyl - 4 - propionoxypiperidine.

The compounds of this invention have analgesic properties. In mammals they show an effective analgesic dose far lower than that of the commonly employed analgesics. For use as analgesics, the compounds preferably are administered parenterally. Solutions suitable for injection are conveniently prepared by dissolving in water, saline or other aqueous medium a pharmaceutically acceptable acid addition salt of one of the piperidine bases of this invention. For example, 1-(3-phenyl-3-acetoxypropyl-1)-4-phenyl-4-acetoxypiperidine hydrochloride, can be dissolved in water to give a one percent solution which when ampouled and sterilized is suitable for parenteral administration. Analgesia is provided as by subcutaneous injection of the solution in such amount that from about 0.01 to about 0.1 milligram of the active compound is administered per kilogram of body weight of the treated subject.

The compounds can also be administered orally in the form of compressed tablets, filled capsules, suspensions, and the like. When administered orally, the doses are several times larger than the above-suggested parenteral doses.

The novel piperidine bases provided by this invention are prepared by reacting 4-phenyl-4-hydroxypiperidine with formaldehyde and acetophenone to yield ω-(4-phenyl-4-hydroxy-piperidino)-propiophenone which is reduced with sodium borohydride to the corresponding secondary alcohol. The dihydroxy compound thus obtained is then acylated in accordance with known acylation procedures to yield the diacylated base. The base is converted to an acid addition salt by conventional methods, for example, by treating the base with an aqueous or alcoholic solution of a stoichiometric equivalent amount of acid, and evaporating the solution to dryness.

This invention is further illustrated by the following specific examples.

EXAMPLE 1

*Preparation of 1-(3-phenyl-3-acetoxypropyl-1)-4-phenyl-4-acetoxypiperidine*

A reaction mixture consisting of 23 g. of 4-phenyl-4-hydroxypiperidine, 6 g. of paraformaldehyde, 15.7 g. of acetophenone, 4.8 g. of anhydrous hydrogen chloride and 120 ml. of ethanol was refluxed for about one hour, and was cooled. 6 g. of paraformaldehyde were added to the mixture, and the mixture was refluxed for an additional sixteen hours. The reaction mixture was then cooled to about room temperature, and the ethanol was removed by evaporation in vacuo. The residue which contained ω - (4 - phenyl - 4 - hydroxypiperidino) - propiophenone hydrochloride formed in the reaction was dissolved in water, and the piperidine base suspension was precipitated by making the solution alkaline with 6 N ammonium hydroxide. To the alkaline suspension were added 100 ml. of benzene to dissolve the ω-(4-phenyl-4-hydroxypiperidino)-propiophenone free base which had separated. The benzene layer was separated, and the benzene was removed by evaporation in vacuo leaving as a residue ω - (4 - phenyl - 4 - hydroxypiperidino) - propiophenone. The residue was dissolved in ethyl acetate, and the solution was saturated with anhydrous hydrogen chloride, thus forming an insoluble white precipitate of ω-(4-phenyl-4-hydroxypiperidino) - propiophenone hydrochloride. The hydrochloride salt was filtered off, and recrystallized from a mixture of methanol and ethyl acetate. The purified salt melted at about 190–191° C.

24.0 g. of ω-(4-phenyl-4-hydroxypiperidino)-propiophenone hydrochloride were dissolved in water, and the solution was made alkaline with 6 N ammonium hydroxide. The ω - (4 - phenyl - 4 - hydroxypiperidino)-propiophenone which separated was taken up in a mixture of chloroform and ether. The organic layer was separated and dried, and the solvent mixture removed in vacuo leaving the free base as a solid residue. The base was dissolved in 100 ml. of methanol, and the solution was added in small portions to a mixture containing 8.8 g. of sodium borohydride and 300 ml. of methanol. After the addition was complete, the mixture was stirred for about six hours. The methanol was then removed in vacuo leaving a solid residue comprising 1-(3-phenyl-3-hydroxypropyl - 1) - 4 - phenyl - 4 - hydroxypiperidine. The residue was dissolved in 10 percent hydrochloric acid solution, the solution was washed with ether, and the ether layer was discarded. The acid solution was made alkaline with 6 N ammonium hydroxide to liberate 1 - (3 - phenyl - 3 - hydroxypropyl - 1) - 4 - phenyl - 4-hydroxypiperidine free base. The free base which separated as an oil was crystallized by cooling it to about 0° C. and scratching it with a glass rod. The crystalline free base was separated by filtration, was dissolved in ethanol, and the ethanol solution was saturated with anhydrous hydrogen chloride gas yielding a precipitate of 1 - (3 - phenyl - 3 - hydroxypropyl - 1) - 4 - phenyl - 4-hydroxypiperidine hydrochloride. The hydrochloride salt was filtered off and was recrystallized from methanol-ethyl acetate solvent mixture. The purified salt melted at about 192–3° C.

To 15 g. of 1 - (3 - phenyl - 3 - hydroxypropyl - 1) -4- phenyl - 4 - hydroxypiperidine hydrochloride dissolved in about 100 ml. of pyridine were added about 35 ml. of acetic anhydride. The mixture was refluxed for about one hour, thus forming 1 - (3- phenyl - 3 - acetoxypropyl-1) - 4 - phenyl - 4 - acetoxypiperidine hydrochloride. The reaction mixture was cooled, and the pyridine was removed by evaporation in vacuo, yielding a residue containing 1 - (3 - phenyl - 3 - acetoxypropyl - 1) - 4 - phenyl- 4 - acetoxypiperidine hydrochloride. The residue was dissolved in water, and the water solution was made alkaline with 6 N ammonium hydroxide thus forming 1-(3-phenyl- 3 - acetoxypropyl - 1) - 4 - phenyl - 4 - acetoxypiperidine free base. The free base which was insoluble in aqueous alkali separated as an oil. Ether was added to the mixture to dissolve the oil, the ether layer was separated, was washed with water, and was dried. After removal of the drying agent, the ether solution was saturated with anhydrous hydrogen chloride gas to form a precipitate of 1 - (3 - phenyl - 3 - acetoxypropyl - 1) - 4- phenyl - 4 - acetoxypiperidine hydrochloride. The precipitate was filtered off and recrystallized three times from a mixture of methanol and ethyl acetate. 1-(3-phenyl-3-acetoxypropyl - 1) - 4 - phenyl - 4 - acetoxypiperidine hydrochloride thus purified melted at about 160–161° C. The crystalline compound contained 1 mol of water. *Analysis.*—Calculated: C, 64.06; H, 7.15; Cl, 7.90. Found: C, 64.14; H, 6.80; Cl, 8.02.

EXAMPLE 2

*Preparation of 1-(3-phenyl-3-propionoxypropyl-1)-4-phenyl-4-propionoxypiperidine*

Following the procedure of Example 1, 2 g. of 1-(3-phenyl - 3 - hydroxypropyl - 1) - 4 - phenyl - 4 - hydroxypiperidine hydrochloride, 6.0 ml. of propionic anhydride and 10 ml. of pyridine were refluxed for about one hour thus forming 1 - (3 - phenyl - 3 - propionoxypropyl - 1) - 4- phenyl - 4 - propionoxypiperidine hydrochloride. The compound was purified by the procedure set forth in Example 1 for the corresponding diacetoxy compound except that the ethereal solution of the purified free base was treated with 0.70 g. of maleic acid in ether instead of with gaseous hydrogen chloride. 1-(3-phenyl-3-propionoxypropyl - 1) - 4 - phenyl - 4 - propionoxypiperidine maleate which precipitated was recrystallized three times from an ethyl acetate-ether solvent mixture. The purified salt melted at about 110–111° C. *Analysis.*—Calculated: C, 66.77; H, 6.91. Found: C, 66.30; H, 7.07.

EXAMPLE 3

*Preparation of 1-(3-phenyl-3-butyroxypropyl-1)-4-phenyl-4-butyroxypiperidine*

Following the procedure of Example 1, 0.70 g. of 1-(3-phenyl - 3 - hydroxypropyl - 1) - 4 - phenyl - 4 - hydroxypiperidine hydrochloride, 3.0 ml. of butyric anhydride and 5 ml. of pyridine were refluxed for about one hour thus forming 1 - (3 - phenyl - 3 - butyroxypropyl - 1) - 4- phenyl-4-butyroxypiperidine hydrochloride. The compound was purified by the procedure set forth in Example 1 for the corresponding diacetoxy compound except that the ethereal solution of the purified free base was treated with 0.25 g. of maleic acid in ether instead of with gaseous hydrogen chloride. The 1 - (3 - phenyl - 3 - butyroxypropyl - 1) - 4 - phenyl - 4 - butyroxypiperidine maleate which precipitated was recrystallized three times from an ethyl acetate-ether solvent mixture. The purified salt melted at about 151–152° C. *Analysis.*—Calculated: C, 67.70; H, 7.28. Found: C, 67.95; H, 7.18.

I claim:

1. A compound of the group consisting of an oxygenated 4-phenylpiperidine and non-toxic pharmaceutically acceptable acid addition salts thereof, said oxygenated 4-phenylpiperidine being represented by the following formula:

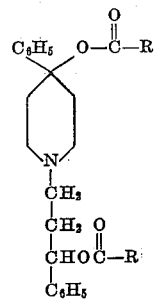

wherein R is an alkyl group having from 1 to 3 carbon atoms.

2. 1 - (3 - phenyl - 3 - acetoxypropyl - 1) - 4 - phenyl-4-acetoxypiperidine.

3. 1 - (3 - phenyl - 3 - acetoxypropyl - 1) - 4 - phenyl-4-acetoxypiperidine hydrochloride.

4. 1 - (3 - phenyl - 3 - propionoxypropyl - 1) - 4- phenyl-4-propionoxypiperidine.

5. 1 - (3 - phenyl - 3 - butyroxypropyl - 1) - 4 - phenyl-4-butyroxypiperidine.

References Cited in the file of this patent

UNITED STATES PATENTS

| | | |
|---|---|---|
| 2,846,437 | Elpern | Aug. 5, 1958 |
| 2,850,500 | Elpern | Sept. 6, 1958 |

OTHER REFERENCES

Perrine et al.: J. Org. Chem., vol. 121 (1956), pp. 125–126.

Braenden et al.: Bulletin World Health Organization, vol. 13, pp. 956–963.